United States Patent [19]

Murakami et al.

[11] Patent Number: 4,652,938

[45] Date of Patent: Mar. 24, 1987

[54] DIGITAL PROCESSING CIRCUIT FOR VIDEO SIGNAL

[75] Inventors: Mitsuru Murakami; Masanori Kojima, both of Nagaokakyo, Japan

[73] Assignee: Mitsubishi Denki Kabushiki Kaisha, Tokyo, Japan

[21] Appl. No.: 686,583

[22] Filed: Dec. 26, 1984

[30] Foreign Application Priority Data

Jan. 19, 1984 [JP] Japan .................................... 59-8332

[51] Int. Cl.$^4$ .............................................. H04N 9/493
[52] U.S. Cl. ................................. 358/310; 360/33.1; 360/32; 358/12
[58] Field of Search ........................... 358/310, 12, 15; 360/33.1, 32, 39, 24

[56] References Cited

U.S. PATENT DOCUMENTS 4,513,327 4/1985 Takahashi et al. ................... 358/310
4,549,201 10/1985 Tanaka et al. ......................... 358/13

OTHER PUBLICATIONS

"Sub-Nyquist Sampled PCM NTSC Color TV Signal Derived from Four Times the Color Subcarried Sampled Signal", John P. Rossi, *IEE Conference Publication*, 166 (1978), pp. 218-221.

*Primary Examiner*—Robert L. Richardson
*Attorney, Agent, or Firm*—Lowe, Price, Leblanc, Becker & Shur

[57] ABSTRACT

A digital processing circuit for a video signal digital by processing a composite video signal. More specifically, a composite video signal is separated into a luminance signal and a color signal by means of a Y/C separator (10). The color signal separated is converted into a signal having low frequency by means of a low frequency converter (11) that the signal having low frequency is converted into a digital signal by means of an A/D converter (13). The luminance signal separated is converted into a digital signal by means of an A/D converter (12). Digital signals are transmitted through a transmission line (5). The transmitted luiminance signal is converted into an analog signal by means of a D/A converter (14) so that the analog signal is supplied to a Y/C mixer (17). The transmitted color signal is converted into an analog signal by means of a D/A converter (15) and the analog signal thus obtained is demodulated to a signal having the initial frequency by means of a demodulator (16) so that the signal having the initial frequency is supplied to the Y/C mixer (17). The Y/C mixer (17) mixes the luminance signal converted into the analog signal and the color signal converted to the signal having the initial frequency so that an output signal is provided therefrom.

9 Claims, 4 Drawing Figures

DIGITAL PROCESSING CIRCUIT FOR VIDEO SIGNAL

BACKGROUND OF THE INVENTION

1. Field of the Invention

The present invention relates to a digital processing circuit for a video signal. More particularly, the present invention relates to a digital processing circuit for a video signal, utilized for example in a video tape recorder, in which a composite video signal is converted into digital signals so as to be recorded in a magnetic tape and the recorded digital signals are reproduced so as to be provided as the initial composite video signal.

2. Description of the Prior Art

In a video tape recorder and the like, in order to record a composite video signal in a digital form, it is necessary to sample and digitally process a composite video signal. One of the methods for digitally processing a composite video signal is well known as in "Sub-Nyquist Sampled PCM NTSC Color TV Signal Derived from Four Times the Color Subcarrier" published by J. P. Rossi in pages 218 to 221 in IEEE Conference Publication 166 (1978).

FIG. 1 is a schematic block diagram showing a conventional digital processing circuit. First, referring to FIG. 1, a conventional digital processing circuit will be described. A composite video signal comprising a luminance signal and a color signal is applied to an A/D converter 2 through an input terminal 1. To the A/D converter 2, a clock signal is supplied from a reference clock generator 4 making oscillation in response to a quartz crystal oscillator 3. The A/D converter 2 converts the composite video signal into a digital signal based on a clock signal. The signal converted into a digital signal is transmitted through a transmission line 5. The digital signal transmitted through the transmission line 5 is supplied to a D/A converter 6. To the D/A converter 6, a clock signal is supplied from a reference clock generator 8 making oscillation in response to a quartz crystal oscillator 7. This clock signal is in synchronism with the above described clock signal generated from the reference clock generator 3. The D/A converter 6 converts the transmitted digital signal into an analog signal based on the clock signal from the reference clock generator 8 and provides the analog signal from an output terminal 9. The clock signals provided from the reference clock generators 4 and 8 are generally selected to have frequency three times the color subcarrier frequency of a composite video signal.

In order to convert a composite video signal into a digital signal, it is necessary to apply sampling with a clock signal having frequency twice as large as the maximum frequency component included in the composite video signal, based on the sampling thereon. For example, in an NTSC system, the maximum frequency of a composite video signal is approximately 4.3 MHz of a luminance signal and therefore it is needed to apply sampling with frequency of more than 8.6 MHz. On the other hand, in order to decrease the quantization noise, it is desirable to apply sampling with a clock signal having frequency which is an integer multiple of a color subcarrier frequency. In a conventional system, a clock signal having sampling frequency (10.74 MHz) three times as large as the color subcarrier frequency was applied.

However, if the resolution is lowered and the maximum frequency of a luminance signal is as low as approximately 3 MHz, such frequency is of a level sufficiently suited for domestic use and in such case, the frequency of the color subcarrier becomes the maximum frequency included in a composite video signal, which makes it impossible to apply sampling with frequency lower than twice the color subcarrier frequency. As a result, it is needed to make an A/D converter 2 and a D/A converter 6 have high speed for conversion, which involves a disadvantage that formation of a circuit comes expensive. In addition, when a composite video signal is converted into a digital signal to be transmitted through a transmission line 5, a large number of signals cannot be multiplexed in a given frequency band.

SUMMARY OF THE INVENTION

Therefore, a primary object of the present invention is to provide a digital processing circuit for a video signal, in which a color signal included in a composite video signal is converted to a signal having low frequency so that a composite video signal can be sampled with a relatively low frequency.

Briefly stated, in the present invention, a luminance signal included in a composite video signal is converted to a digital signal by the first A/D converting means, while a color signal included in the composite video signal is converted to a signal having low frequency by low frequency converting means and the low frequency signal is converted to a digital signal by the second A/D converting means, so that both the digital signals are transmitted through a transmission line. The digital signal as the luminance signal transmitted through the transmission line is converted to an analog signal by the first D/A converting means and the digital signal as the color signal is converted to an analog signal by the second D/A converting means. The color signal converted to the analog signal is converted to a signal having the initial high frequency by high frequency converting means so that the initial high frequency color signal is provided as an output.

Consequently, according to the present invention, since the color signal is converted to a signal having low frequency and the composite video signal can be sampled with a relatively low frequency, it is not needed to make the A/D converting means or the D/A converting means have high speed for conversion and therefore formation of a circuit can be realized at low cost.

In a preferred embodiment of the present invention, the frequency of a luminance signal included in a composite video signal is selected to be lower than the subcarrier frequency of a color signal included in the composite video signal and the sampling frequency of sampling signals applied to the first and second A/D converting means and the first and second D/A converting means is selected to be twice the frequency of a luminance signal. More preferably, the frequency of the first sampling signal applied to the first A/D converting means and the first D/A converting means is selected to be twice the frequency of a luminance signal and the frequency of the second sampling signal applied to the second A/D converting means and the second D/A converting means is selected to be twice that of the color signal converted to low frequency.

These objects and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
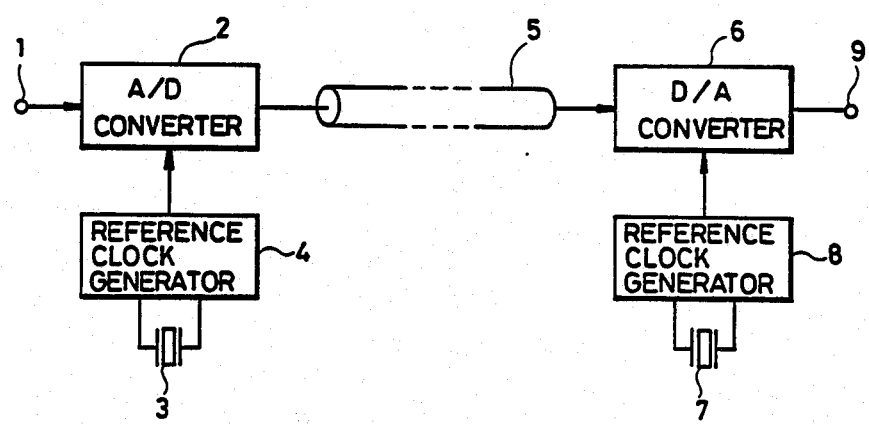
FIG. 1 is a schematic block diagram showing a conventional digital processing circuit.
Figure 2:
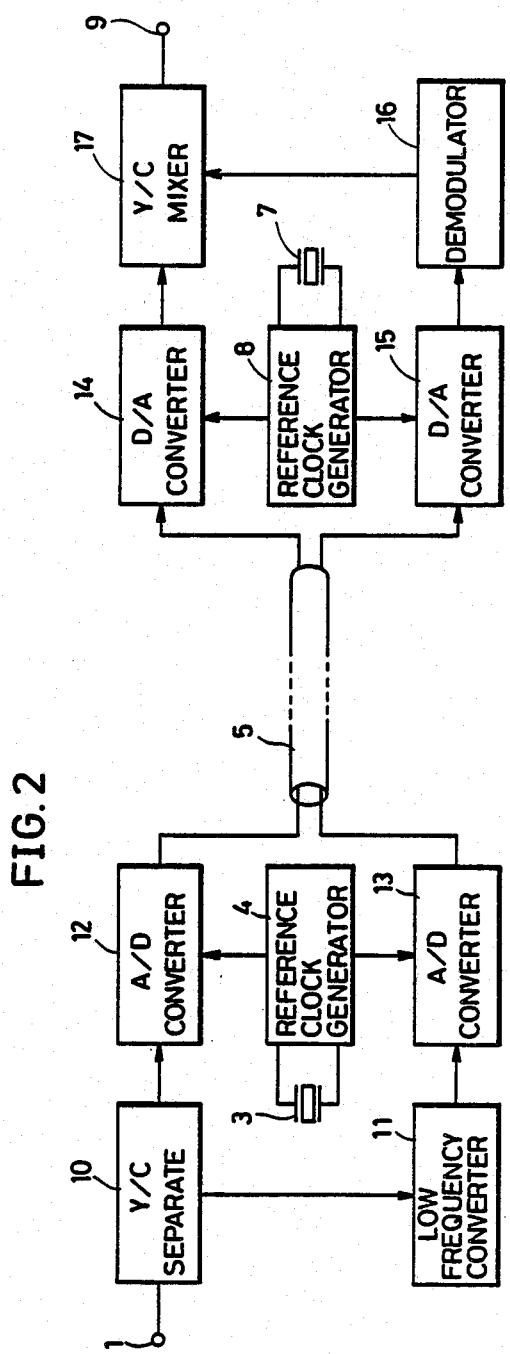
FIG. 2 is a schematic block diagram of an embodiment of the present invention.

First, referring to FIG. 2, a structure of an embodiment of the present invention will be described. A composite video signal applied to an input terminal 1 comprises a luminance signal having frequency of 3 MHz and a color signal having frequency of approximately 3.58 MHz. The composite video signal applied to the input terminal 1 is supplied to a Y/C separator 10. The Y/C separator 10 separates the composite video signal into a luminance signal and a color signal. The color signal separated by the Y/C separator 10 is supplied to a low frequency converter 11. The low frequency converter 11 converts the color signal to a signal having frequency of 629 kHz for example. The color signal converted to the low frequency signal is supplied to an A/D converter 13.

On the other hand, the luminance signal separated by the Y/C separator 10 is supplied to an A/D converter 12. To the A/D converter 12 and to the above described A/D converter 13, clock signals are supplied from a reference clock generator 4 making oscillation in response to a quartz crystal oscillator 3. The A/D converter 12 converts the luminance signal to a digital signal, and the A/D converter 13 converts the color signal having low frequency to a digital signal. The luminance signal and the color signal thus converted to digital signals are transmitted through a transmission line 5.

The digital signal as the luminance signal transmitted through the transmission line 5 is supplied to a D/A converter 14 and the digital signal as the color signal is supplied to a D/A converter 15. To the D/A converters 14 and 15, clock signals are supplied from a reference clock generator 8 making oscillation in response to a quartz crystal oscillator 7. The D/A converter 14 converts the digital luminance signal to an analog signal and the D/A converter 15 converts the digital color signal to an analog signal. The luminance signal converted to the analog signal is supplied to a Y/C mixer 17.

On the other hand, the color signal converted to the analog signal is supplied to a high frequency converting demodulator 16. The high frequency converting demodulator 16 converts the analog-converter low frequency color signal to a signal having the initial subcarrier frequency (for example, 3.579545 MHz in an NTSC system). The color signal converted to the initial high frequency signal is supplied to the Y/C mixer 17. The Y/C mixer 17 mixes the analog-converted luminance signal and the high frequency converted color signal so that the initial composite video signal is provided therefrom.

Now, a specific operation of an embodiment of the present invention will be described. The composite video signal applied from the input terminal 1 is separated into a luminance signal component and a color signal component by the Y/C separator 10. The separated luminance signal is converted to a digital signal by the A/D converter 12 based on the clock signal from the reference clock generator 4. On the other hand, the separated color signal is supplied to the color signal low frequency converter 11, where the color signal is converted to a signal having low frequency of 629 kHz for example. Then, the signal having low frequency is converted to a digital signal by the A/D converter 13.

These digital signals obtained by conversion are transmitted through the transmission line 5 to be supplied to the D/A converters 14 and 15, where the signals are decoded to analog signals. The luminance signal component converted to an analog signal is supplied to the Y/C mixer 17. On the other hand, the color signal component converted to an analog signal is converted to a signal having high frequency by the demodulator 16 and thus the initial color signal is regained. This color signal is supplied to the Y/C mixer 17. The Y/C mixer 17 mixes the luminance signal and the color signal to form a composite video signal, which is provided from the output terminal 9.

As described above, in this embodiment, if the maximum frequency of the luminance signal is made to be 3 MHz by setting the subcarrier frequency of the color signal to 629 kHz for example, the sampling frequency can be made to be 6 MHz. As a result, if the digitally processed composite video signal is transmitted through the transmission line 5, a larger number of signals can be multiplexed in a given frequency band and accordingly, the transmission efficiency can be enhanced. Furthermore, since the sampling frequency can be lowered, the A/D converters 12 and 13 and the D/A converters 14 and 15 need not have high speed for conversion and an apparatus structured by such components can be manufactured at low cost.

Figure 3:
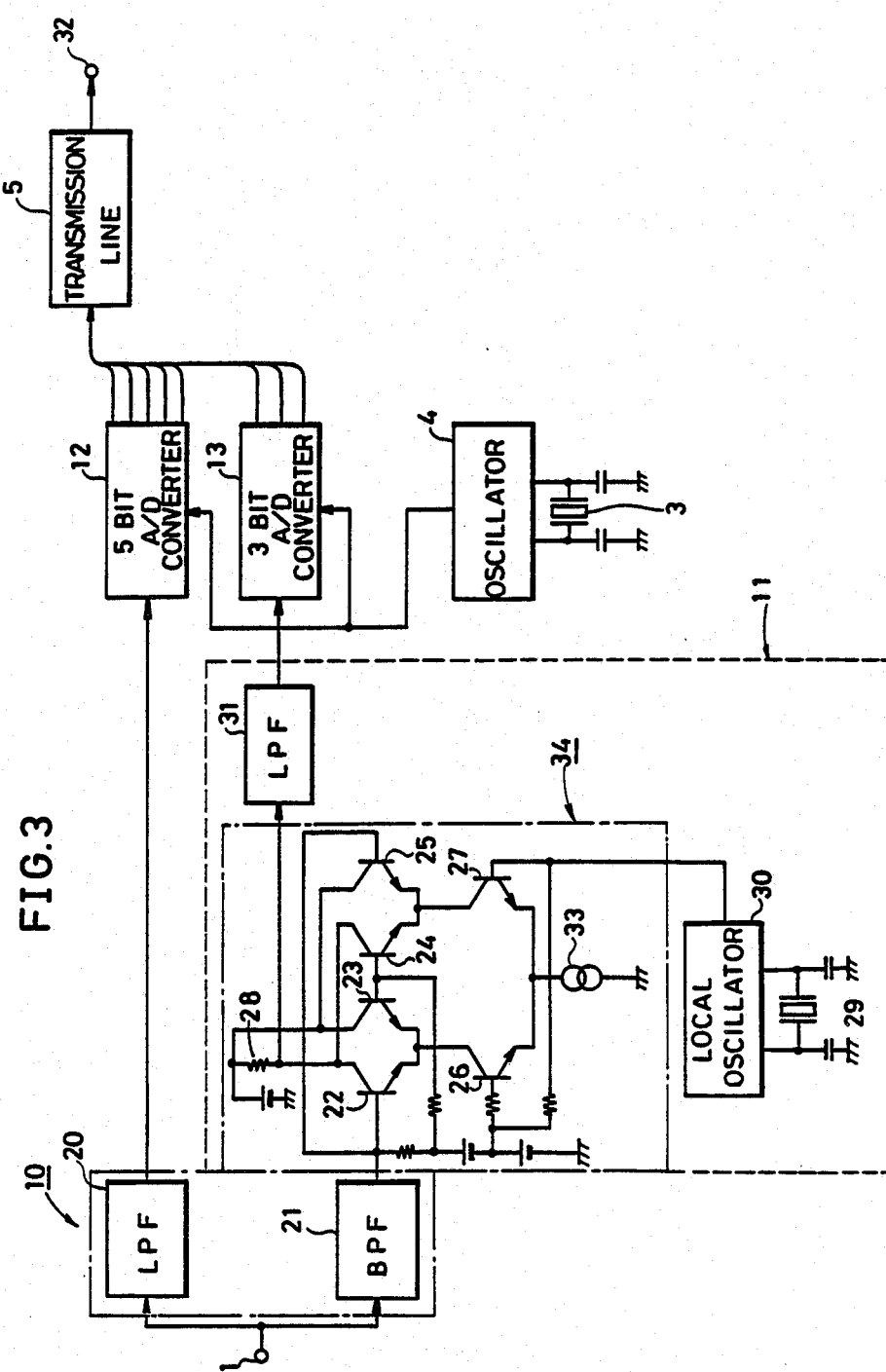
FIG. 3 is a detailed block diagram of the block elements as shown in the left half portion of FIG. 2.
Figure 4:
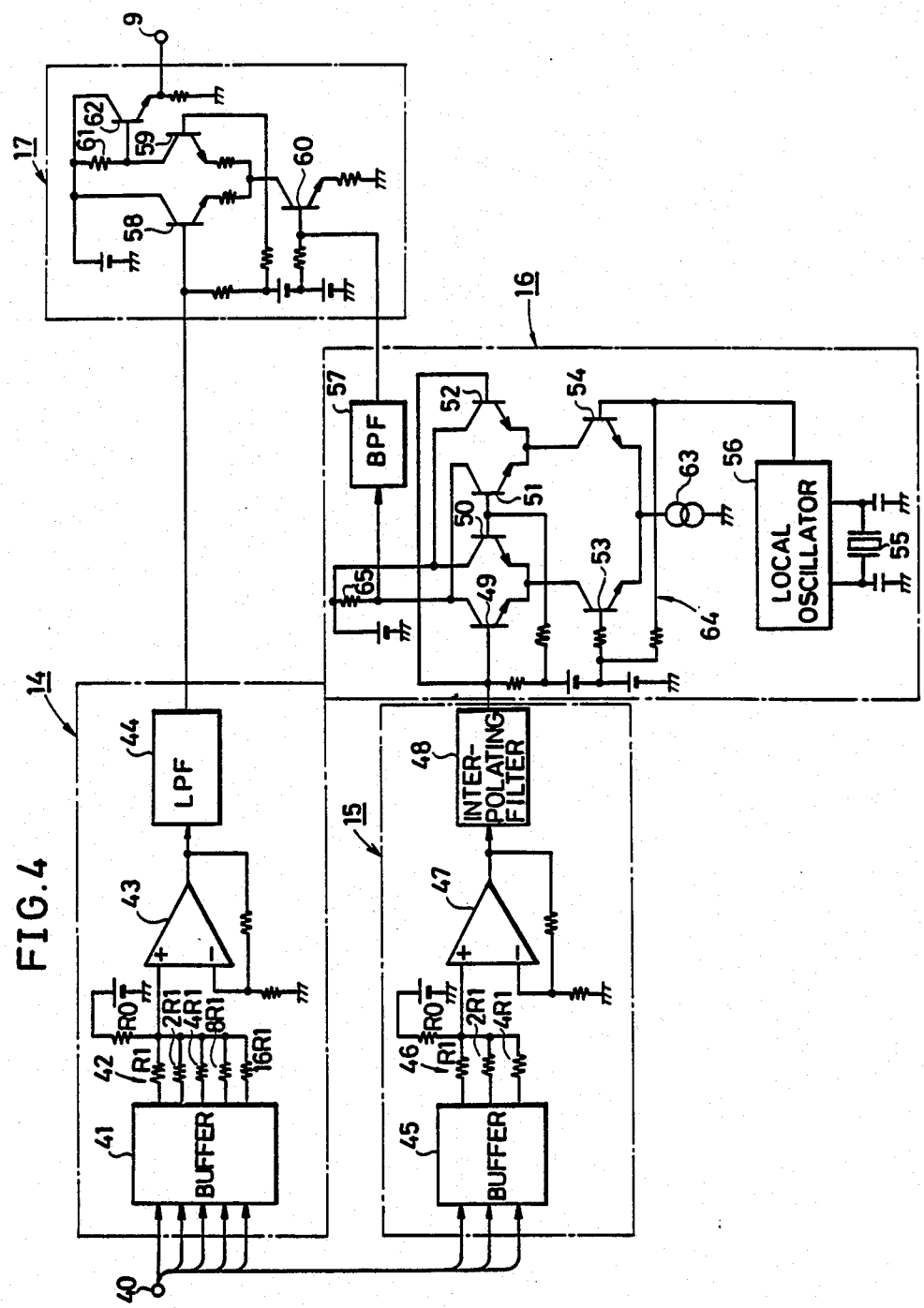
FIG. 4 is a detailed block diagram of the block elements as shown in the right half portion of FIG. 2.

FIGS. 3 and 4 are block diagrams showing more specifically the present invention. First, referring to FIGS. 3 and 4, a structure of the present invention will be described. The composite video signal applied to the input terminal 1 is supplied to a low-pass filter 20 and a band-pass filter 21. The low-pass filter 20 separates a luminance signal component from the composite video signal and the band-pass filter 21 separates a color signal component from the composite video signal. The low-pass filter 20 and the band-pass filter 21 constitute the above described Y/C separator 10 shown in FIG. 2. The color signal separated by the band-pass filter 21 is supplied to a balanced modulator 34. The balanced modulator 34 is structured by transistors 22 and 23, 24 and 25, and 26 and 7 respectively connected differentially as well as by a load resistor 28 and a constant current source 33 and the like. The balanced modulator 34 is connected with a local oscillator 30 making oscillation in response to a quartz crystal oscillator 29.

An output signal of the balanced modulator 34 is supplied to a low-pass filter 31. The low-pass filter 31 serves to obtain a signal having desired low frequency by conversion. The low-pass filter 31, the balanced modulator 34 and the local oscillator 30 constitute the above described low frequency converter 11 shown in FIG. 2. An output signal of the low-pass filter 31 is supplied to the 3-bit A/D converter 13. The separated luminance signal, on the other hand, is supplied to the 5-bit A/D converter 12. To the 5-bit A/D converter 12 and to the 3-bit A/D converter 13, clock signals from the oscillator 4 are supplied as sampling signals. The luminance signal and the color signal digitally processed by the 5-bit A/D converter 12 and the 3-bit A/D converter 13, respectively, are supplied through the transmission line 5 to a transmission line output terminal 32.

Now, referring to FIG. 4, a digital signal input terminal 40 is connected to the transmission line output terminal 32 shown in FIG. 3. The digital signals transmitted through the transmission line 5 and supplied to the digital signal input terminal 40 are supplied to buffers 41 and 45. The respective buffers 41 and 45 store the digital signals temporarily. The digital signal temporarily stored in the buffer 41 is supplied to an amplifier 43 through a ladder resistor 42. The amplifier 43 amplifies the supplied digital signal and provides the amplified signal to an interpolation filter 44. The buffer 41, the ladder resistor 42, the amplifier 43 and the interpolation filter 44 constitute the first D/A converter, which converts the digital luminance signal to an analog signal. The analog-converted luminance signal is supplied to the Y/C mixer 17.

On the other hand, the digital signal as the color signal supplied to the buffer 45 is supplied to an amplifier 47 through a ladder resistor 46. The amplifier 47 amplifies the digital signal and provides the amplified digital signal to an interpolation filter 48. The buffer 45, the ladder resistor 46, the amplifier 47 and the interpolation filter 48 constitute the second D/A converter, which converts the digital color signal to an analog signal. The color signal converted to the analog signal is supplied to a balanced modulator 64.

The balanced modulator 64 comprises transistors 49 and 50, 51 and 52, and 53 and 54 respectively connected differentially as well as a constant current source 63 and a load resistor 65 and the like. To the balanced modulator 64, an oscillation output is provided from a local oscillator 56 making oscillation in response to a quartz crystal oscillator 55. An output signal from the balanced modulator 64 is supplied to a band-pass filter 57. The band-pass filter 57 extracts only a subcarrier frequency component from the analog-converted color signal component. The balanced modulator 64, the local oscillator 56 and the band-pass filter 57 constitute the demodulator 16.

The Y/C mixer 17 comprises transistors 58 and 59 respectively connected differentially, a transistor 60 serving as a constant current source, a load resistor 61 and an output transistor 62. To the base of the transistor 58, an output signal from the first D/A converter 14 is supplied, and to the base of the transistor 60, an output signal from the demodulator 16 is supplied. An output signal from the Y/C mixer is supplied to the output terminal 9.

Referring to FIGS. 3 and 4, the operation of this embodiment will be described in the following. First, in FIG. 3, from the composite video signal applied to the input terminal 1, a luminance signal component is separated by the low-pass filter 20 and a color signal component is separated by the band-pass filter 21. The luminance signal is converted to a 5-bit digital signal by the A/D converter 12. The separated color signal, on the other hand, is supplied to the low frequency converter 11. In the low frequency converter 11, the local oscillator 30 generates a signal of 42 MHz and the balanced modulator 34 provides a component of 3.58 MHz+4.2 MHz and a component of 4.2 MHz−3.58 MHz by conversion based on the color signal component of 3.58 MHz and the component of 4.2 MHz obtained from the local oscillator 30. Out of these components obtained in the balanced modulator 34, only the component of 4.2 MHz−3.58 MHz is extracted by the low-pass filter 31. The low frequency color signal extracted by the low-pass filter 31 is converted to a 3-bit digital signal by the A/D converter 13. Thus, the 5-bit luminance signal and the 3-bit color signal digitally processed are supplied to the transmission line output terminal 32 through the transmission line 5.

The digital signals transmitted through the transmission line 5 are supplied to the digital signal input terminal 40 shown in FIG. 4. Out of the digital signals thus supplied, the luminance signal component is temporarily stored in the buffer 41 included in the first D/A converter 14 and the color signal component is temporarily stored in the buffer 45 included in the second D/A converter 15. These buffers 41 and 45 are structured respectively to serve as an open collector output. When the input signal is in the "L" level, the ladder resistor 42 connected in the output terminal is grounded and voltage divided by the resistor $R_0$ and the grounded resistors out of the resistors $R_1$ to $16R_1$ is applied to the amplifier 43. The amplifier 43 amplifies the applied voltage to provide an output signal, which is interpolated by the low-pass filter 44 so as to be converted to an analog signal.

In the same manner, the color signal component temporarily stored in the buffer 45 is converted to an analog signal by the second D/A converter 15 and the analog signal is then applied to the demodulator 16. The local oscillator 55 included in the demodulator 16 generates an oscillation signal of 4.2 MHz and supplies it to the balanced modulator 64. The balanced modulator 64 provides a component of 4.2 MHz+630 kHz and a component of 4.2 MHz−630 kHz by conversion based on the analog-converted low frequency color signal of 630 kHz and the local oscillation output of 4.2 MHz. Out of these components, only the component of 4.2 MHz−630 kHz=3.58 kHz as the subcarrier frequency is extracted by the band-pass filter 57 so as to be supplied to the Y/C mixer 17. In the Y/C mixer 17, the luminance signal component is supplied to the base of the transistor 58 and the color signal component is supplied to the base of the transistor 60, so that a mixed signal, namely, a composite video signal is obtained in the output of the load resistor 61. This composite video signal is provided from the output terminal 9.

Although in the above described embodiment, the composite video signal converted into digital signals is decoded after having been transmitted through the transmission line 5, the transmission line 5 may be any suitable digital record medium (a magnetic memory or a semiconductor memory for example).

Although sampling is applied to the luminance signal and to the color signal with the same reference clock signal, it is not necessarily needed to use the same reference clock signal. The reference clock frequency of the color signal may be lowered to twice the frequency of the low frequency color signal.

As a digital converting system for a low frequency converted color signal, a differential digital converting system may be utilized and instead of the low frequency converted color signal, an R-Y signal or a B-Y signal which is a fundamental component of the color signal may be applied. In addition, if the present invention is applied to an apparatus such as a video tape recorder in which a color signal is converted to a signal having low frequency to be recorded, a circuit for converting a color signal to low frequency or to high frequency can be made unnecessary.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital processing circuit for a composite video signal comprising a luminance signal component and a color signal component, comprising:

first A/D converting means for converting the luminance signal component included in the composite video signal to a digital signal, low frequency converting means for converting the color signal component included in said composite video signal to a signal having low frequency, second A/D converting means for converting an output signal of said low frequency converting means to a digital signal, a transmission line for transmitting output signals of said first and second A/D converting means, first and second D/A converting means for converting said output signals of said first and second A/D converting means transmitted through said transmission line to analog signals respectively, and high frequency converting means for converting an output signal of said second D/A converting means to a signal having high frequency.

2. A digital processing circuit for a video signal in accordance with claim 1, wherein the frequency of said luminance signal component in said composite video signal is selected to be lower than the subcarrier frequency of said color signal component.

3. A digital processing circuit for a video signal in accordance with claim 2, further comprising sampling signal generating means for applying sampling signals to said first and second A/D converting means and said first and second D/A converting means respectively, the sampling frequency of said sampling signals being selected to be twice the frequency of said luminance signal component.

4. A digital processing circuit for a video signal in accordance with claim 2, wherein said sampling signal generating means comprises:

first sampling signal generating means for applying a first sampling signal to said first A/D converting means and said first D/A converting means, and second sampling signal generating means for applying a second sampling signal to said second A/D converting means and said second D/A converting means, the sampling frequency of said first sampling signal being selected to be twice the frequency of said luminance signal component, and the sampling frequency of said second sampling signal being selected to be twice the frequency of said low frequency converted color signal.

5. A digital processing circuit for a video signal in accordance with claim 2, wherein said high frequency converting means comprises means for demodulating an output signal of said second D/A converting means to the initial color signal of said composite video signal.

6. A digital processing circuit in accordance with claim 5, further comprising mixing means for mixing an output signal of said first D/A converting means and an output signal of said high frequency converting means to reproduce a composite video signal.

7. A digital processing circuit for a video signal in accordance with claim 1, wherein said transmission line includes a digital record medium.

8. A digital processing circuit for a video signal in accordance with claim 7, wherein said digital record medium includes a magnetic memory.

9. A digital processing circuit for a video signal in accordance with claim 7, wherein said digital record medium includes a semiconductor memory.

* * * * *